US009128172B2

(12) United States Patent
Chan et al.

(10) Patent No.: US 9,128,172 B2
(45) Date of Patent: Sep. 8, 2015

(54) PACKET BASED LOCATION PROVISIONING IN WIRELESS NETWORKS

(71) Applicant: Verizon Patent and Licensing Inc., Arlington, VA (US)

(72) Inventors: Yee Sin Chan, San Jose, CA (US); Jin Yang, Orinda, CA (US); Kamlesh S. Kamdar, Dublin, CA (US); Jay J. Lee, San Ramon, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 205 days.

(21) Appl. No.: 13/898,857

(22) Filed: May 21, 2013

(65) Prior Publication Data

US 2013/0250795 A1    Sep. 26, 2013

Related U.S. Application Data

(63) Continuation of application No. 12/645,899, filed on Dec. 23, 2009, now Pat. No. 8,467,309.

(51) Int. Cl.
*G01S 5/06* (2006.01)
*G01S 5/14* (2006.01)
*H04W 64/00* (2009.01)

(52) U.S. Cl.
CPC ... *G01S 5/06* (2013.01); *G01S 5/14* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 6,556,832 B1 | 4/2003 | Soliman | |
| 2003/0003923 A1* | 1/2003 | Tsunehara et al. | 455/456 |
| 2003/0125046 A1 | 7/2003 | Riley et al. | |
| 2004/0172190 A1 | 9/2004 | Tsunehara et al. | |
| 2004/0203865 A1 | 10/2004 | Krasner | |
| 2004/0203913 A1* | 10/2004 | Ogino et al. | 455/456.1 |
| 2005/0037775 A1 | 2/2005 | Moeglein et al. | |
| 2005/0206566 A1 | 9/2005 | Stilp et al. | |
| 2005/0281363 A1 | 12/2005 | Qi et al. | |
| 2007/0202887 A1 | 8/2007 | Counts et al. | |
| 2008/0032709 A1 | 2/2008 | Guvenc et al. | |
| 2008/0042898 A1 | 2/2008 | Sharma | |
| 2008/0049743 A1 | 2/2008 | Zampetti | |
| 2008/0076450 A1 | 3/2008 | Nanda et al. | |
| 2008/0161011 A1* | 7/2008 | Babin et al. | 455/456.1 |
| 2008/0261615 A1 | 10/2008 | Kalhan | |
| 2009/0011713 A1 | 1/2009 | Abusubaih et al. | |
| 2009/0034447 A1 | 2/2009 | Yu et al. | |
| 2009/0067477 A1 | 3/2009 | Grilli et al. | |
| 2009/0258658 A1 | 10/2009 | Edge et al. | |
| 2010/0045508 A1 | 2/2010 | Ekbal et al. | |

(Continued)

*Primary Examiner* — Benjamin H Elliott, IV

(57) ABSTRACT

A system may include a plurality of wireless devices, each wireless device including a time source and configured to selectively communicate with at least one other of the plurality of wireless devices by way of a packet-based time precision protocol. The plurality of wireless devices may include a first wireless device and a second wireless device, the first wireless device being configured to determine whether the first wireless device and the second wireless device are in selective communication over a single-hop wireless link; determine a one-way delay over the single-hop wireless link by way of at least one packed-based time precision protocol message; and calculate a distance measurement between the first wireless device and the second wireless device based at least in part on the one-way delay.

21 Claims, 8 Drawing Sheets

(56) References Cited

U.S. PATENT DOCUMENTS

| | | |
|---|---|---|
| 2010/0081451 A1* | 4/2010 | Mueck et al. .............. 455/456.1 |
| 2010/0093377 A1 | 4/2010 | Riley et al. |
| 2010/0120422 A1 | 5/2010 | Cheung et al. |
| 2010/0135178 A1* | 6/2010 | Aggarwal et al. ............. 370/252 |
| 2010/0248668 A1 | 9/2010 | Katayama et al. |
| 2010/0291949 A1 | 11/2010 | Shapira et al. |
| 2011/0045840 A1* | 2/2011 | Alizadeh-Shabdiz et al. .......................... 455/456.1 |
| 2011/0291882 A1 | 12/2011 | Walsh et al. |
| 2012/0142366 A1* | 6/2012 | De Castro Riesco et al. .......................... 455/456.1 |

* cited by examiner

(12)  United States Patent US 9,128,172 B2

PACKET BASED LOCATION PROVISIONING IN WIRELESS NETWORKS

CROSS REFERENCE TO RELATED APPLICATIONS

This application is a continuation of U.S. patent application Ser. No. 12/645,899, filed on Dec. 23, 2009, now U.S. Pat. No. 8,467,309, issued on Jun. 18, 2013, which is hereby incorporated by reference in its entirety.

BACKGROUND

In a wired communications system, a location of a particular device may be relatively fixed by a wired connection from the device to a base station, where the base station acts as an access point to a communications network. However, with the advent of wireless communications systems, wireless devices now have greater freedom of movement around the communications network. Because of this freedom, a wireless device may move in location with respect to a base station with which the wireless device may be in selective communication. Moreover, the wireless device may move from being in communication with one or more base stations to a location wherein the wireless device may be in communication with other base stations. Thus, the communications network may desire specific information regarding the position of a wireless device in relation to the one or more base stations presently providing communications services to the wireless device.

DETAILED DESCRIPTION

Figure 1:
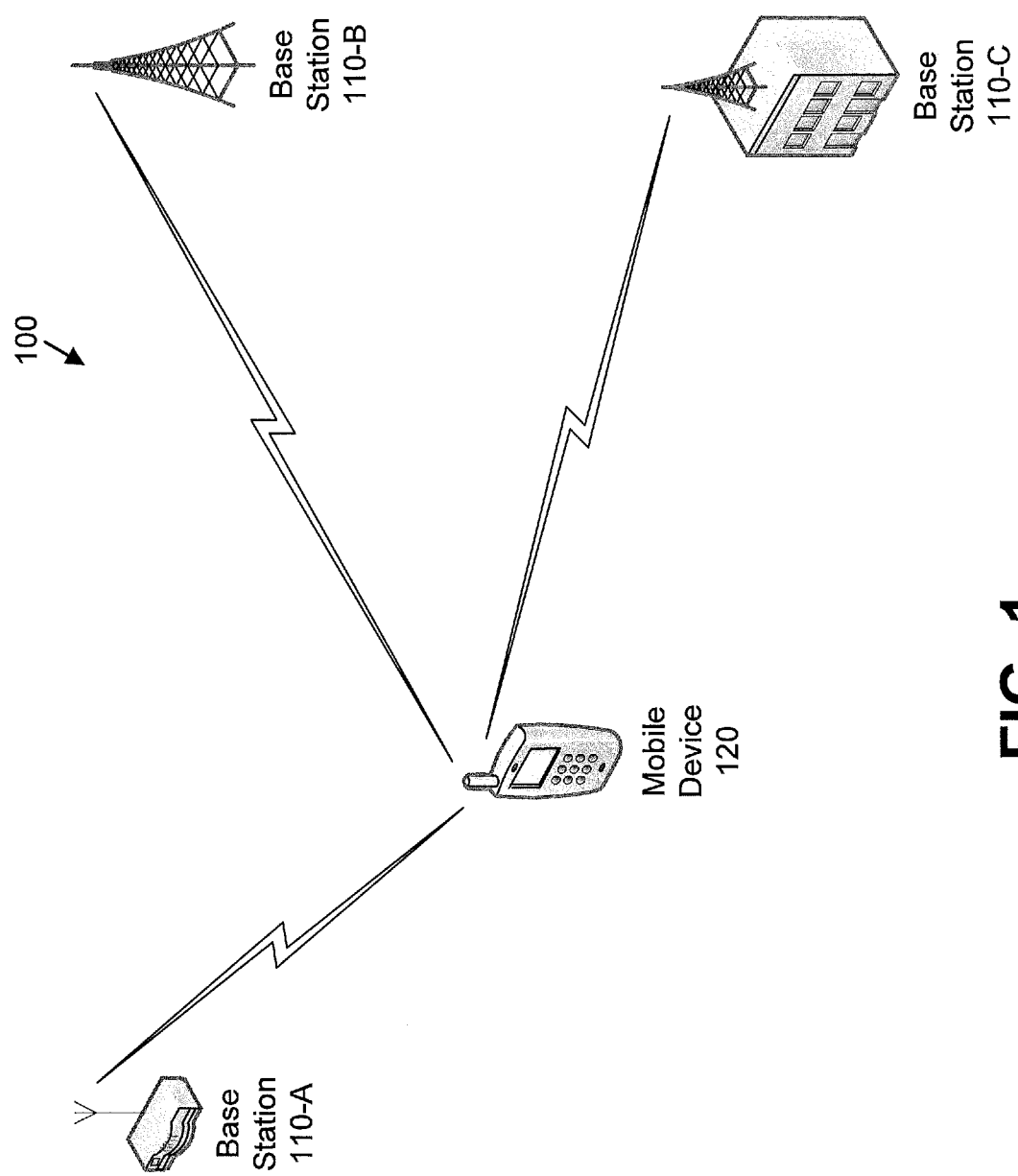
FIG. 1 illustrates an exemplary system for provisioning a location of a mobile device.

Location provisioning, or providing a location of a mobile device, may allow for user service customization and operator self-organizing networks (SON). Accordingly, location provisioning may be a key technology for location based services (LBS), emergency services, network reconfigurability and self-organizing networks (SON). By combining location information with user-specific information, truly customized personal communications services may be provided through mobile devices. Moreover, by using location provisioning and network topology information, a communications network may implement network reconfiguration and self-organization. By way of network reconfiguration and self-organization, a communications system may improve system performance metrics including operating efficiency and network coverage.

Location provisioning may be accomplished through various technologies and methods. As some examples, location information may be provided through global navigation satellite system (GNSS) and cellular-based localization.

GNSS systems, such as the Global Position System (GPS) developed by United States Department of Defense, may provides positioning, navigation, and timing services to users through reception of precise timing signals sent by the GPS satellites in medium Earth orbit, combined with knowledge of the locations of the GPS satellites and geometric trilateration. However, location provisioning by way of conventional standalone GPS may be problematic in providing reliable positions in poor satellite signal conditions, such as urban environments (surrounded by tall buildings) or indoor locations.

With regard to cellular-based localization, such as GSM and CDMA location, a system may use network infrastructure of a service provider to identify a current location of a mobile device by way of cell identification. Cell identification may provide positioning information based on a known physical location of a communications cell providing service to the mobile device, such as by way of a home location register (HLR). However, location provisioning by way of conventional cellular-based approaches may lack accuracy, and may be tied to a particular communications infrastructure.

A packet-based location provisioning approach may be utilized to perform location provisioning independent of underlying technology. Utilizing a time difference of arrival (TDOA) technique, a system may determine a time difference and therefore a distance of a mobile device from one or more other devices, such as mobile base-stations. If at least three other devices are accessible by a mobile device, then the location of the mobile device may be calculated by trilateration techniques.

Moreover, while the packet-based location provisioning approach may be performed independent of underlying technology, aspects of the underlying technology may affect a relative weighting value that may be associated with a particular distance measurement. As an example, a distance measurement over a more precise technology may be afforded a higher weighting in location provisioning calculations over a technology with a lower precision. As another example, a distance measurement determined by way of a device including more precise hardware may be afforded a higher weighting in location provisioning calculations than a device including hardware of lower precision.

Further a weighting value may be assigned to a distance measurement based on the distance measurement itself. As some examples, a distance measurement may be denied inclusion in location provisioning calculations, such as by being reduced to zero according to a distance threshold, if the distance indicated exceeds a range wherein a particular underlying technology is determined to be accurate. Alternately, a weighting may be assigned to a distance measurement inversely proportional to the distance measurement, or linearly decreasing with respect to the distance measurement.

Exemplary uses for the packet-based location provisioning approach may include improving accuracy of an emergency call location determination, improving accuracy of a location for location based services, and facilitating mesh network maintenance. Additionally, the packet-based location provisioning approach may improve an ability of a location provisioning system to operate in conditions where a single technology may be unsuitable such as allowing location provisioning inside of a structure in part by way of an internal wireless network where GPS signals may not adequately penetrate, and further allowing more accurate GPS location to be performed where GPS signals may be received.

FIG. 1 illustrates an exemplary system 100 for provisioning a location of a mobile device 120 including a plurality of base stations 110-A, 110-B, and 110-C. System 100 may take many different forms and include multiple and/or alternate components and facilities. While an exemplary system 100 is shown in FIG. 1, the exemplary components illustrated in FIG. 1 are not intended to be limiting. For example, while exemplary system 100 includes three base stations 110-A, 110-B, and 110-C and one mobile device 120, it should be noted that systems having more or fewer base stations 110 and mobile devices 120 are possible. Indeed, additional or alternative components and/or implementations may be used.

Each base station 110 may be configured to be in selective communication with one or more networks, including one or more communications networks. Communications networks may include one or more interconnected networks (e.g., Public Switched Telephone Network (PSTN), VoIP, cellular telephone, GPRS, etc.), that provide communications services, including voice calling, packet-switched network services (including, for example, Internet access and/or VoIP communication services), Short Message Service (SMS) messaging, Multimedia Messaging Service (MMS) messaging services, and location services, to at least one mobile device 120.

Each base station 110 may further be in selective wired or wireless communication with to at least one subscriber device, such as mobile device 120. The mobile device 120 may be a device in selective communication with the base station 110 on the network and may also move in location with respect to the base stations 110. Exemplary mobile devices 120 may include laptop computers, mobile telephones and smartphones, GPS devices, PDAs, e-Book readers, and automobiles, among others.

Exemplary wireless communications technologies by which a base station 110 may be in communication with a mobile device 120 may include packet based networks including General Packet Radio Services (GPRS), High Packet Rate Data (HPRD), Long Term Evolution (LTE), IEEE 802.11 (Wi-Fi), IEEE 802.16 (WiMAX), or cdma2000 and WCDMA, etc., as well as communications networks including multiple radio technologies such as mesh networks or mobile ad-hoc networks (MANET).

Figure 2:
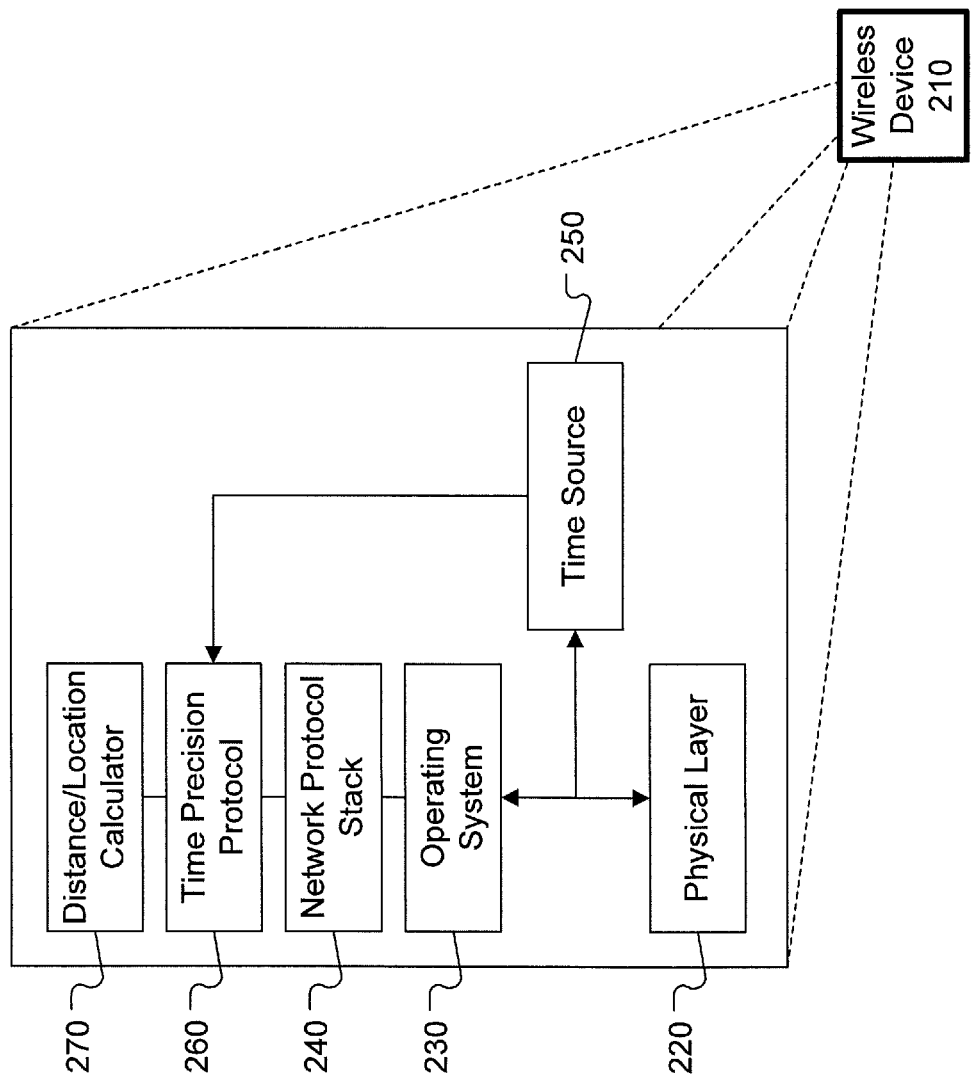
FIG. 2 illustrates an exemplary wireless device configured to facilitate the provisioning of location information.

FIG. 2 illustrates an exemplary wireless device 210 configured to facilitate the provisioning of location information. In some examples the wireless device 210 may be a mobile device 120, while in other examples the wireless device may be a base station 110. As shown in the Figure, the exemplary wireless device 210 may include a physical layer 220, an operating system 230, a network protocol stack 240, a time source 250, a time precision protocol 260, and a distance/location calculator 270. The wireless device 210 and its included components 220-270 may be provided as hardware or firmware, or as hardware and/or firmware in further combination with software. Additionally, although one example of the modularization of the wireless device 210 is illustrated and described, it should be understood that the operations thereof may be provided by fewer, greater, or differently named modules.

The physical layer 220 may include underlying hardware devices that allow for the transmission technologies of the wireless device 210 to function, including the wireless transmitter and receiver. The physical layer 220 may be configured to provide services to other functionality, such as establishment and termination of connections over a communications network, transmission contention detection and resolution, transmission flow control, conversion of a representation of a transmission in device memory into a corresponding signal to be transmitted over the communications network, and conversion of a received signal transmitted over the communications network into a representation of the received transmission in device memory.

The operating system 230 may include software configured to make use of the services provided by the physical layer 220, and to provide one or more interfaces between the physical layer 220 and one or more computing applications that may be hosted by the operations system 230. Accordingly, the operations system 230 may abstract away specific details of the physical layer 220 to simplify the implementation of higher-level application libraries and programs.

The network protocol stack 240, or communications stack, may include an implementation of one or more computer networking protocols. In some examples, at least a portion of the network protocol stack 240 may be included in operating system 230, while in other examples the network protocol stack 240 may be implemented on top of the operating system 230 by way of the services and hardware abstractions provided by the operating system 230. An exemplary network protocol stack 240 is the Open System Interconnection Reference Model (OSI Reference Model or OSI Model), which generally divides a network architecture into seven layers which, from top to bottom, are the Application, Presentation, Session, Transport, Network, Data-Link, and Physical Layers (such as physical layer 220). An exemplary network protocol stack 240 may include HTTP application support, TCP transport support, IP Internet support, and Ethernet link support over the communications services provided by the physical layer 220.

The time source 250 may be a device such as a clock that may be used to determine the current time. The time source 250 may be further configured to produce a timestamp indicative of the current time. Exemplary time sources 250 may include a precision GPS time source rubidium oscillator, and an electronic oscillator regulated by a quartz crystal, among others.

The time precision protocol 260 may be a protocol implemented as part of or on top of the network protocol stack 240 and operating system 230, and may further make use of the timestamp services provided by the time source 250. An exemplary time precision protocol 260 is the precision time protocol (PTP) standard time-transfer protocol defined by the IEEE 1599-2002 standard. IEEE 1599 defines a standard for a precision clock synchronization protocol for networked measurement and control systems, and is designed to addresses time source 250 synchronization requirements between devices on a communications network. IEEE 1599 may thus allow for improved timing accuracy with a minimum of administration and by way of relatively low cost devices. Time source 250 synchronization between devices afforded by a time precision protocol 260 may be beneficial for operations including enforcing timing restrictions and constraints between systems, and timely control of remote devices.

The distance/location calculator 270 may be an application implemented in software, hardware, or a combination of software and hardware within wireless device 210, using at least a portion of the services provided by one or more of the time source 250, the time precision protocol 260, the network protocol stack 240, the operations system 230, and the physical layer 220. The distance/location calculator 270 may be configured to determine a delay between wireless devices 210, to determine a distance of a wireless device 210 from one or more other wireless devices 210, to optimize a set of weighting factors associated with the determined distances, and to calculate a location of a wireless device 210 based on determined distances and weighting factors. The distance/location calculator 270 may further be configured to provide location provisioning services for the wireless device 210. Further details regarding the distance/location calculator 270 are discussed in greater detail below.

In general, computing systems and/or devices, such as the base stations 110, mobile devices 120, and wireless devices 210 may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., the Linux operating system, the Android operating system developed by the Open Handset Alliance, the Symbian Operating system developed by the Symbian Foundation, and the iPhone operating system developed by Apple Computer, Inc., of Cupertino, Calif. Examples of computing devices include, without limitation, a computer workstation, a server, a desktop, notebook, laptop, or handheld computer, a mobile device, a personal digital assistant (PDA), or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements such as operating system 230, network protocol stack 240, time precision protocol 260, and distance/location calculator 270 may be implemented in part as computer-readable instructions (e.g., software) on one or more computing devices (e.g., servers, personal computers, wireless devices 210, etc.), stored on computer readable media associated therewith (e.g., disks, memories, etc.). A computer program product may comprise such instructions stored on computer readable media for carrying out the functions described herein.

Figure 3:
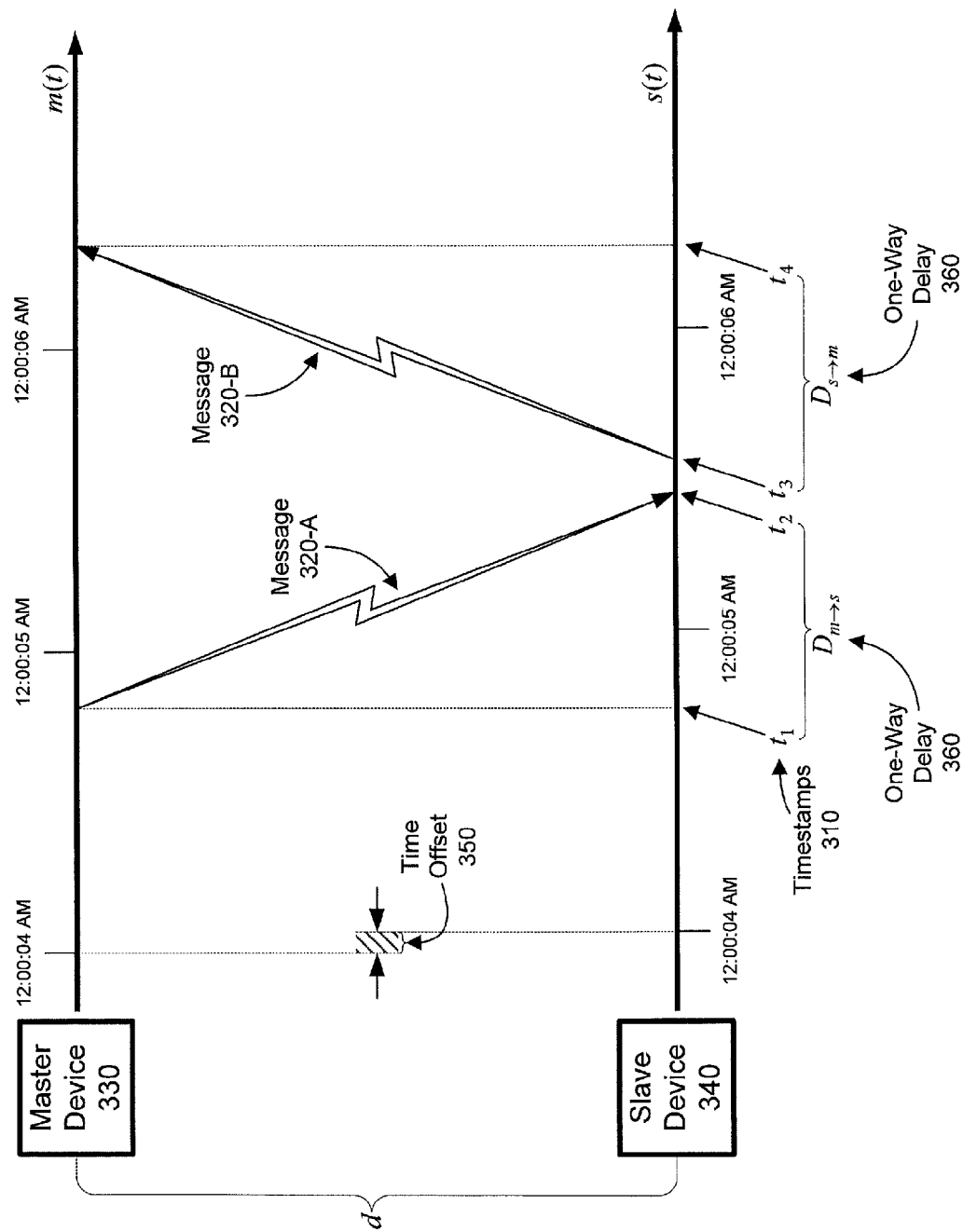
FIG. 3 illustrates an exemplary determination of a time offset and a one-way delay between a master device and a slave device by way of a time precision protocol.

FIG. 3 illustrates an exemplary determination of a time offset 350 and a one-way delay 360 between a master device 330 and a slave device 340 by way of a time precision protocol 260. The determination of a time offset 350 and a one-way delay 360 may be performed over a single-hop wireless link between the master device 330 and the slave device 340 by way of packet-based messages 320 including timestamps 310.

A timestamp 310 may be represented as a sequence of characters or bytes indicative of a particular date and/or time at which a certain event may have occurred. In some cases a timestamp 310 may be represented in a human-readable textual form, while in other cases a timestamp 310 may be represented in a computer-readable format, such as a number of units of time since a predefined epoch (e.g., seconds since Jan. 1, 1970 or milliseconds since midnight on Jan. 1, 1601.) Timestamps 310 may be generated by a time source 250 included in a device, such a time source 250 included in a wireless device 210 (e.g., a base station 110 or a mobile device 120).

A message 320 may include one or more packets configured to traverse a communication network, where each packet may be a grouping of content into a suitably sized block of information. When messages 320 traverse network adapters, switches, routers and other network nodes, the packets may be buffered and queued, resulting in variable delays and also variable throughput depending on the traffic load in the network. When messages 320 traverse wireless networks, the packets may experience line-of-sight (LOS) delay proportional to the distance traveled. Other delay than LOS delay may be referred to as non-line-of-sight (NLOS) delay.

A master device 330 may be a wireless device 210 configured to perform a master role in a time precision protocol 260. A slave device may be a wireless device 210 configured to perform a slave role in the time precision protocol 260. A time source 250 may be included in a master device 330 and a second time source 250 may be included in a slave device 340. These time sources 250 may be used to determine a one-way delay 360 between the devices.

The master device 330 may send a message 320-A to the slave device 340, and may determine a timestamp 310 $t_1$ indicative of the time the message 320-A is sent using the time source 250 included in the master device 330. The slave device 340 may receive the message 320-A, and may determine a timestamp 310 $t_2$ using its local time source 250 indicative of the time the message 320-A is received. The slave device 340 may further send a message 320-B to the master device 330, and may determine a timestamp 310 $t_3$ indicative of the time the message 320-B is sent using the time source 250 included in the slave device 340. The master device 330 may receive the message 320-B and may determine a timestamp 310 $t_4$ using its local time source 250 indicative of the time the message 320-B is received. The travel time of the messages 320-A and 320-B between the devices 330 and 340 may accordingly be determined by way of the timestamps 310 (i.e., $t_1$, $t_2$, $t_3$, and $t_4$). The travel time from the master device 330 to the slave device 340 (or from the slave device 340 to the master device 330) may be referred to as a one-way delay 360.

It should be noted that the time sources 250 included in the different devices may not be exactly synchronized. As a result, timestamps 310 generated by different time sources 250 may be generated at the same time, but may indicate slightly different time values. As an example, a time source 250 included in the master device 330 and a second time source 250 included in the slave device 340 may produce timestamps 310 that indicate slightly different times for the same point in time. This difference between the timestamps 310 generated by the two devices may be referred to as a time offset 350. This time offset 350 may introduce an amount of error into the calculation of a one-way delay 360 between the devices.

The time precision protocol 260 may additionally be configured to calculate the time offset 350 between a master device 330 and a slave device 340 by way of the timestamps 310 $t_1$, $t_2$, $t_3$, and $t_4$. Further, once the time offset 350 between the devices is determined, the time offset 350 may be taken into account and utilized to perform more precise timing measurements between the master device 330 and the slave device 340 than would otherwise be possible without taking into account the time offset 350. For example, once the one time offset 350 is determined, further one-way measurements may be performed between the master device 330 and the slave device 340. Depending on implementation, nanosecond range accuracy may potentially be achieved, for example, through use of time sources 250 local to each device and capable of precise timestamp 310 generation.

Mathematically, let s(t) be the time source 250 measurement of the slave device 340 at time t, and let m(t) be the time source 250 measurement of the master device 330 at time t. Accordingly, the time offset 350 o(t) between the slave device 340 and the master device 330 may be defined as the difference between these two time sources measurements:

a. $o(t)=s(t)-m(t)$ (1)

Letting $D_{m->s}$ be defined as the transit time of the message 320-A from the master device 330 to the slave device 340, the difference between timestamp 310 $t_2$ and timestamp 310 $t_1$ may be defined as the time offset 350 plus the message 320-A transit time $D_{m->s}$:

a. $t_2-t_1=o(t)+D_{m->s}$ (2)

Letting $D_{s->m}$ be defined as the transit time of the message 320-B from the slave device 340 to the master device 330, the difference between timestamp 310 $t_4$ and timestamp 310 $t_3$ may be defined the negative time offset 350 plus the message 320-B transit time $D_{s->m}$:

a. $t_4-t_3=-o(t)+D_{s->m}$ (3)

Further, assuming that the transit time from the master device 330 to the slave device 340 is equal to the transit time from the slave device 340 to the master device 330, D may be defined as the one-way delay 360 between the devices 330 and 340 as follows:

a. $D_{m->s}=D_{s->m}=D$ (4)

From (2) and (3), the distance/location calculator 270 may determine that the offset time o(t) between the slave device 340 and master device 330 devices in term of the timestamps 310:

a. $o(t)=(t_2+t_3-t_1-t_4)/2$ (5)

Similarly, from (2) and (3) the distance/location calculator 270 may also be determine the one-way delay 360 D in terms of the timestamps:

a. $D=(t_2-t_1+t_4-t_3)/2$ (6)

Once determined by the distance/location calculator 270, the one-way delay 360 D may be used by the distance/location calculator 270 to derive a distance d of the single-hop wireless transmission between the master device 330 and the slave device 340. For wire-line systems in which devices and terminals may be connected through electrical wires or optical fibers, depending on the physical route taken by a message 320 between the devices, there may not be a direct relationship between the measured one-way delay 360 D and the physical distance d between the two devices. However, for the wireless counterparts, wireless signals travel at substantially the speed of light, which may be referred to as c. Accordingly, for a substantially LOS wireless propagation, a distance d between two devices may be defined in terms of the measured one-way delay 360 D as follows:

a. $d=D \cdot c$

For a link including a NLOS propagation portion, the distance/location calculator 270 may determine the distance d taking into account an additional error term $e_{NLOS}$ corresponding to further delay that may be a result of the NLOS propagation portion. Accordingly, a distance d between two devices taking into account NLOS delay may be defined as follows:

a. $d=D \cdot c+e_{NLOS}$

In further instances, a NLOS error may exist and not be correctable, and in such instances a determination would have to be made, for example by the distance/location calculator 270, whether the uncorrectable error is acceptable. In some instances, the uncorrectable error may be an acceptably low percentage of the overall error of the system or may potentially provide for a better location provisioning than if no value is provided at all, especially if there is no other source for location provisioning information available.

Accordingly, using a distance/location calculator 270 over the time precision protocol 260, the distance d between two wireless devices may be measured using the one-way delay 360 D information determined through use of the time precision protocol 260. Moreover, because the exchanges of messages 320 for the calculation of the time offset 350 and one-way delay 360 D are packet based and independent of the radio access technology, substantially any packet based wireless communications network may be used to implement the location provisioning, including networks that include multiple and varied access technologies. Packet based distance determinations may thus be implemented over various suitable wireless links using various radio access technologies, such as GPRS, HPRD, LTE, WiFi, WiMax, cdma2000, and WCDMA, among other technologies.

Figure 4:
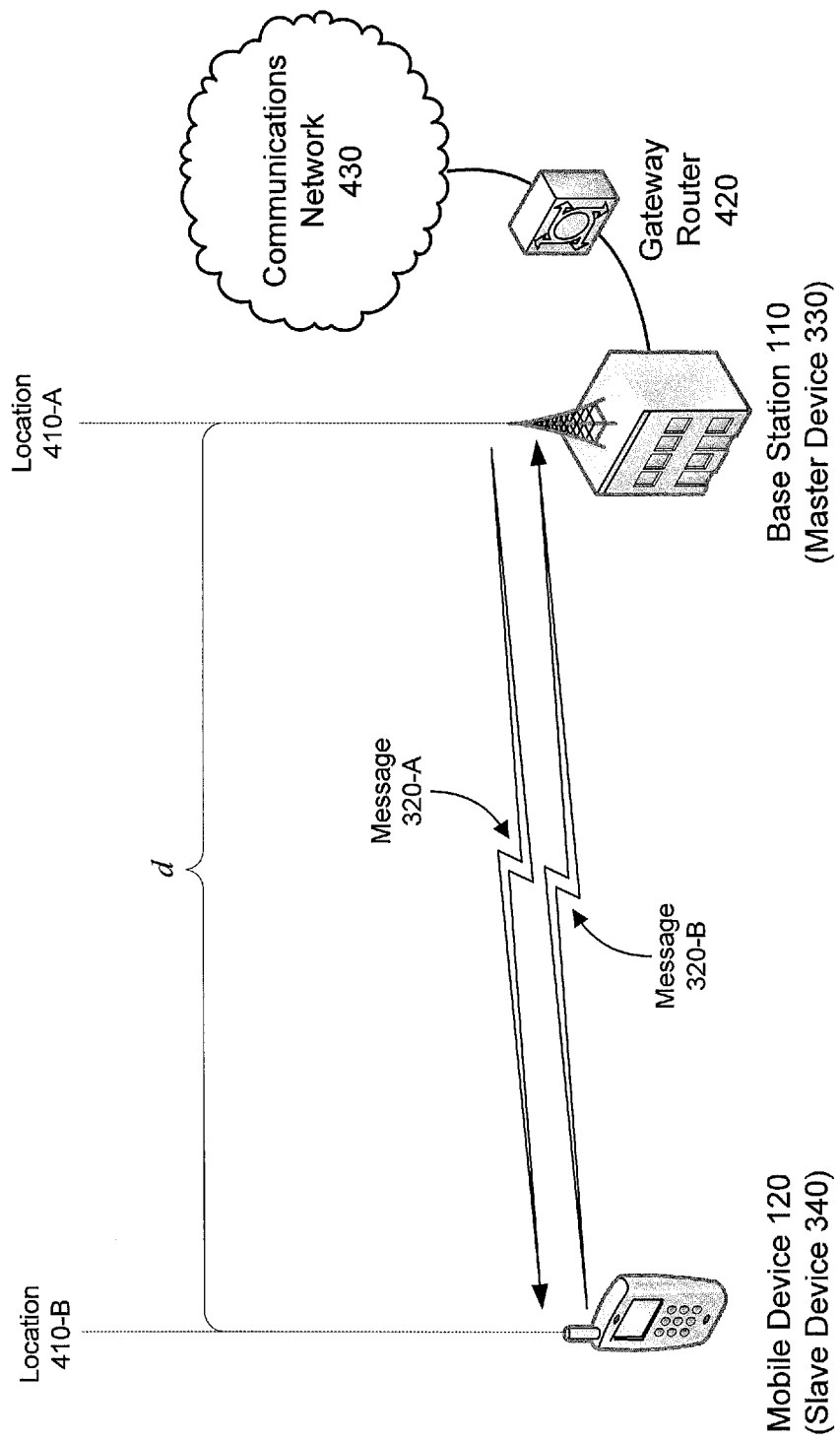
FIG. 4 illustrates an exemplary distance determination between a base station acting as a master device and a mobile device acting as a slave device.

FIG. 4 illustrates an exemplary distance determination between a base station 110 acting as a master device 330 and a mobile device 120 acting as a slave device 340. By utilizing the distance/location calculator 270 over the time precision protocol 260 discussed above, a distance d between the location 410-A of the base station 110 and the location 410-B of the mobile device 120 may accordingly be determined.

A wireless device 210, such as a base station 110 or a mobile device 120, may be located at a particular position in space. This position in space may be referred to as a location 410. A location 410 may be represented in one or more dimensions, and in various coordinate systems, such as Cartesian or Polar coordinates. As some examples, a location 410 may be represented as a latitude and a longitude or as X, Y, and Z coordinates. In some instances, a location 410 may further include information indicating the margin of error of the indicated position. One exemplary location 410 format may include an X coordinate, a Y coordinate, and a margin of error for the X and Y coordinates.

The base station 110 acting as the master device 330 may be configured to provide access to a GPS based synchronized wireless network such as a HPRD communications network 430 via a gateway router 420. Accordingly, a GPS receiver included in the base station 110 may be configured to act as the precise time source 250 for the master device 330 functionality. A one-way delay 360 between the base station 110 may be derived by a time precision protocol 260 by way of the timestamps 310 included in the messages 320-A and 320-B as discussed above, taking into account the determined time offset 350. Further, a distance d between the location 410-A of the base station 110 and the location 410-B of the mobile device 120 may be calculated according to the one-way delay 360.

Once the location 410-B of the mobile device 120 is calculated, the location 410-B may be utilized for location provisioning. However, while the distance d between the base station 110 and the mobile device 120 may be determined with only one base station 110, the location 410 of the mobile device 120 may only be provisioned with limited accuracy.

Figure 5:
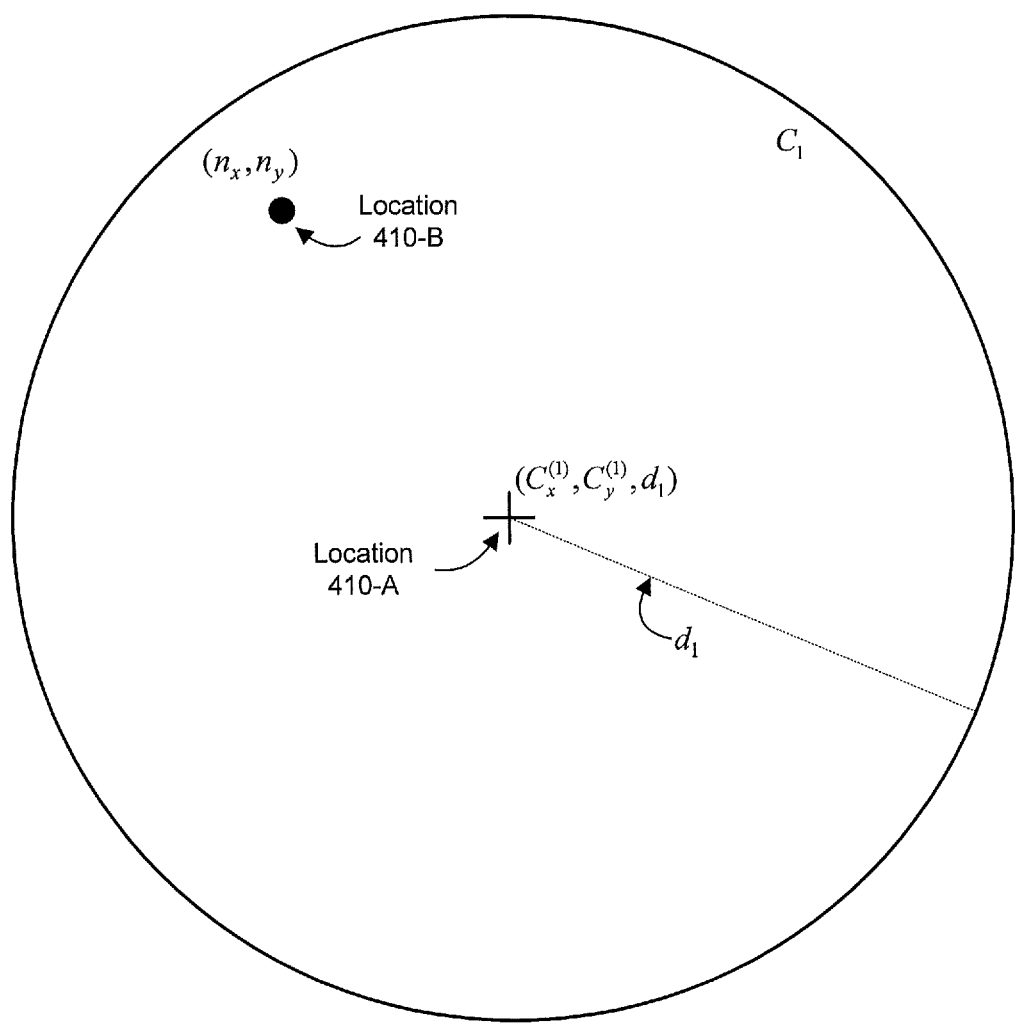
FIG. 5 illustrates an exemplary location provisioning for a mobile device in selective communication with a single base station.

FIG. 5 illustrates an exemplary location provisioning for a mobile device 120 in selective communication with a single base station 110-1. Continuing with the example of FIG. 4, by utilizing the distance/location calculator 270 over the time precision protocol 260 discussed above, a distance d between the location 410-A of the base station 110 and the location 410-B of the mobile device 120 may accordingly be determined.

Moreover, as shown in FIG. 5 an actual location 410-B of the mobile device 120 may be represented as a tuple $(n_x, n_y)$. Additionally, the location 410-B of the mobile device 120 may be represented as a tuple $(C_x^{(1)}, C_y^{(1)}, d_1)$ including an X and a Y location 410-A of the base station 110-1 and a margin of error equal to the measured distance $d_1$ of the mobile device 120 from the location 410-A of the base station 110-1.

The system may determine a number N of neighboring wireless devices 210 that support location provisioning. For example, a wireless device 210 may determine its neighbors according to routing information or one or more broadcast messages, and may query each of its neighbors to determine if the neighbor supports a time precision protocol 260. Mathematically, if the number of neighboring base stations 110 equals one (i.e., N=1), then the location 410 $(n_x, n_y)$ of the mobile device 120 may be represented as the location 410 of the base station 110, with error equal to the measured distance $d_1$:

a. $(n_x, n_y) = (C_x^{(1)}, C_y^{(1)})$ b. Error = $d_1$

Figure 6:
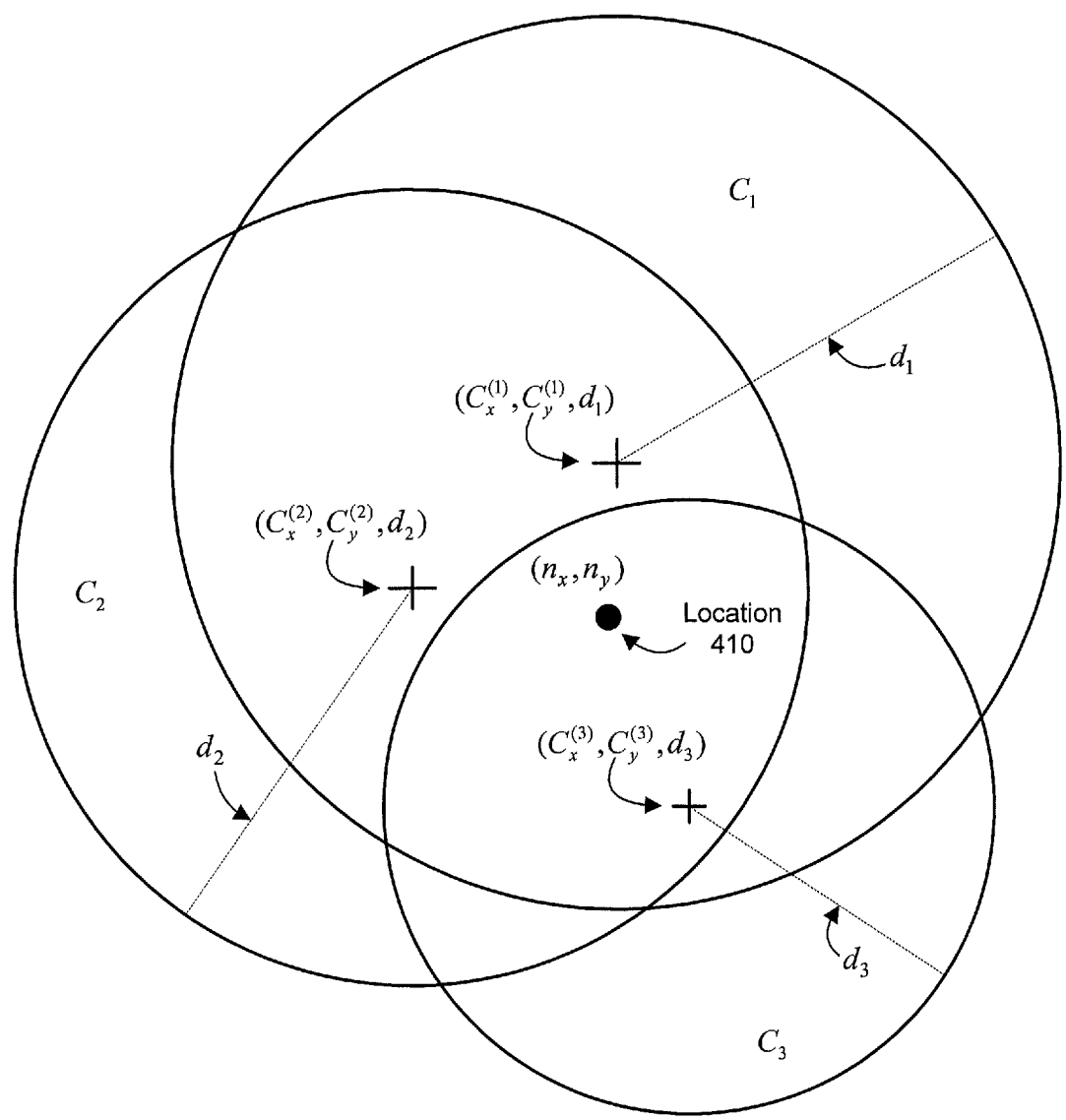
FIG. 6 illustrates an exemplary location provisioning for a mobile device in selective communication with multiple base stations.

FIG. 6 illustrates an exemplary location provisioning for a mobile device 120 in selective communication with multiple base stations 110 (i.e., where N≥2). As shown, a location 410 for a mobile device 120 may be determined in a system including three base stations 110-1, 110-2, and 110-3 (i.e., where N=3). By utilizing the exemplary set of three distances $(d_1, d_2, d_3)$ between the location 410 of each of the three base stations 110 $(C_x^{(1)}, C_y^{(1)})$, $(C_x^{(2)}, C_y^{(2)})$, $(C_x^{(3)}, C_y^{(3)})$, the location 410 $(n_x, n_y)$ of the mobile device 120 may be more accurately determined.

Trilateration is a method for determining the intersections of the surfaces of a set of three sphere surfaces, given the centers and radii of the three spheres. For simplicity, only the X and Y coordinates are illustrated; however, use of a third dimension Z is also possible and contemplated. Trilateration methods may be used to find an intersection point $(n_x, n_y)$ indicating the location 410 of a mobile device 120.

Mathematically, for any N≥2, let $\overline{C} = (C_x^{(1)}, C_y^{(1)})$, $(C_x^{(2)}, C_y^{(2)})$, $(C_x^{(3)}, C_y^{(3)})$, ..., $(C_x^{(N)}, C_y^{(N)})$ be the coordinates of the locations of N fixed base stations 110, specified as an (X, Y) coordinate center point of each base station 110. Further, let $\overline{D} = (d_1, d_2, d_3, ..., d_N)$ be the measured distances from the corresponding fixed base stations 110, and let $\overline{\Delta D} = (\Delta d_1, \Delta d_2, \Delta d_3, ..., \Delta d_N)$ correspond to a set of non-zero residues due to measurement errors.

With these definitions, an exemplary trilateration may be performed by way of the following N equations:

a. $(n_x - C_x^{(1)})^2 + (n_y - C_y^{(1)})^2 - d_1^2 = \Delta d_1^2$ b. $(n_x - C_x^{(2)})^2 + (n_y - C_y^{(2)})^2 - d_2^2 = \Delta d_2^2$ c. $(n_x - C_x^{(3)})^2 + (n_y - C_y^{(3)})^2 - d_3^2 = \Delta d_3^2$ d. :

e. $(n_x - C_x^{(N)})^2 + (n_y - C_y^{(N)})^2 - d_N^2 = \Delta d_N^2$

The location 410 $(n_x, n_y)$ of the mobile device 120 may be found by solving an optimization problem using a least square approach, whereby the sum $S = (\Delta d_1 + \Delta d_2 + \Delta d_3 + ... + \Delta d_N)$ of the squared residuals $\overline{\Delta D}$ may be minimized. These calculations may be performed, for example, by way of the distance/location calculator 270. An exemplary algorithm for performing the least squares optimization problem may be the Levenberg-Marguardt algorithm, among other suitable numerical algorithms and methods.

The optimization may further take into account weighting factors so as to optimize the location provisioning according to various factors. Specifically, each of the measured distances $(d_1, d_2, d_3, ..., d_N)$ may be associated with corresponding weighting factor $\overline{\Omega} = (\omega_1, \omega_2, ..., \omega_N)$. As an example, a distance measurement over a more precise technology may be afforded a higher weighting in location provisioning calculations over a technology with a lower precision. As another example, a distance measurement determined by way of a device including more precise hardware may be afforded a higher weighting in location provisioning calculations than a device including hardware of lower precision. As yet another example, a distance measurement may be denied inclusion or weighted relatively lightly in location provisioning calculations if the distance indicated exceeds a range wherein a particular underlying technology is determined to be accurate.

Accordingly, an exemplary least squares optimization problem taking into account weighting factors may be determined by way of the following equations:

$$a.\ (n_x, n_y) = \underset{(n_x,n_y)}{\arg\min} \sum_{j=1}^{N} (\omega_1 \Delta d_1^2 + \omega_2 \Delta d_2^2 + \ldots + \omega_N \Delta d_N^2).$$

$$b.\ \text{Error} = \sum_{j=1}^{N} (\omega_1 \Delta d_1^2 + \omega_2 \Delta d_2^2 + \ldots + \omega_N \Delta d_N^2);\ \text{and}$$

$$c.\ \sum_{i=1}^{N} \omega_i = 1$$

It should be noted that setting each of the weights equally corresponds to a conventional trilateration:

$$a.\ \omega_i = \frac{1}{N},\ \forall\ i \in [1, N]$$

Accordingly, the squares optimization problem taking into account weighting factors may accordingly be solved by the distance/location calculator 270, and may produce a solution indicating the location 410 of the mobile device 120.

As an example, a mobile device 120 may be in selective communication with three other wireless devices 210. The first other device may be a Wi-Fi base station 110 in selective communication with an Internet communication network. The second other wireless device 210 may be a CDMA cellular communications tower base station 110 in selective communication with a CDMA communications network. The third other wireless device 210 may be another mobile device 120 within LOS of the wireless device 210 for which a location may be provisioned.

Measured distances ($d_1$, $d_2$, $d_3$) may be determined between the mobile device 120 and each of the three other wireless devices 210 by way of the packet-based location provisioning approach. The CDMA tower base station 110 may be assigned a relatively high weighting (e.g., a weighting factor $\omega$ of 0.7), the Wi-Fi connection may be assigned a lower weighting (e.g., a weighting factor $\omega$ of 0.2), and the other mobile device 120 may be assigned a lowest weighting (e.g., a weighting factor $\omega$ of 0.1). An optimization may be performed utilizing the determined distances ($d_1$, $d_2$, $d_3$) and assigned weighting factors $\overline{\Omega} = (\omega_1, \omega_2, \omega_3)$. Accordingly, the result of the optimization may be used to provision the location 410 ($n_x, n_y$) of the mobile device 120.

Figure 7:
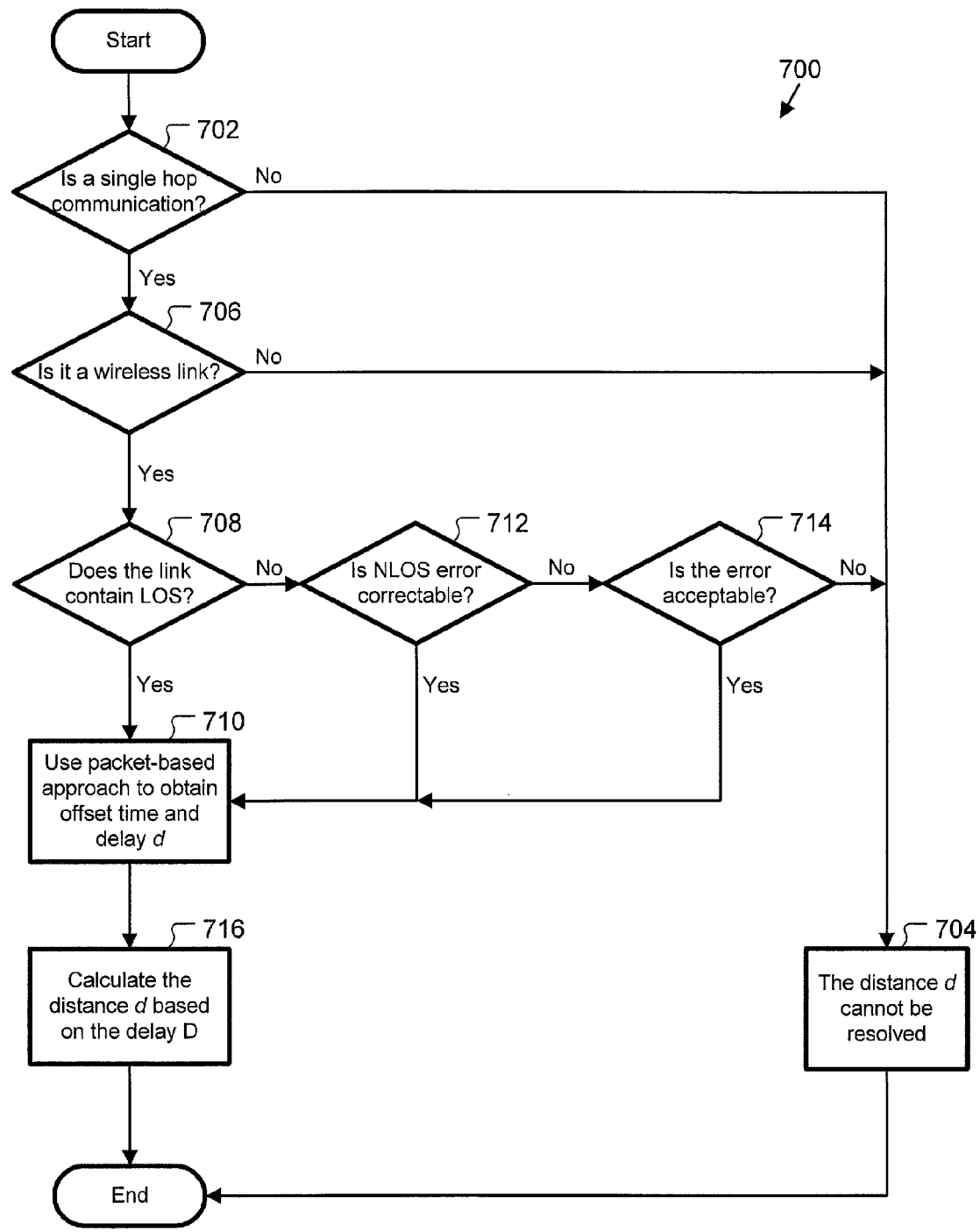
FIG. 7 illustrates an exemplary process for determining a distance measurement between a master device and a slave device utilizing a packet-based location provisioning approach.

FIG. 7 illustrates an exemplary process 700 for determining a distance d measurement between a master device 330 and a slave device 340 utilizing a packet-based location provisioning approach. In some examples, the master device 330 may be a base station 110, while in other examples the master device 330 may be a mobile device 120. Further, in some examples the slave device 340 may be a base station 110, while in other examples the slave device 340 may be a mobile device 120.

In decision point 702, the master device 330 determines whether the communication is a single-hop communication. If the master device 330 determines that the communication is over multiple hops, then the distance d cannot be resolved and accordingly block 704 is executed next. Otherwise, decision point 706 is executed next.

In decision point 706, the master device 330 determines whether the communication is over a wireless link. If the master device 330 determines that the communication is not over a wireless link, then the distance d cannot be resolved and accordingly block 704 is executed next. Otherwise, decision point 708 is executed next.

In decision point 708, the master device 330 determines whether the link for which a delay D is to be determined is substantially LOS. If the master device 330 determines that the link is substantially LOS, then block 710 is executed next. Otherwise, decision point 712 is executed next.

In decision point 712, the master device 330 determines whether the link for which a delay D is to be determined includes a NLOS error that is correctable. If the master device 330 determines that the $e_{NLOS}$ is correctable, then block 710 is executed next. Otherwise, decision point 714 is executed next.

In decision point 714, the master device 330 determines whether the uncorrectable NLOS error quantity $e_{NLOS}$ is acceptable. If the master device 330 determines that the $e_{NLOS}$ is acceptable, then block 710 is executed next. Otherwise block 704 is executed next.

In block 710, the master device 330 and the slave device 340 determine a time offset 350 and a transmission delay D by way of the packet-based location provisioning approach discussed in detail above. After block 710, block 716 is executed next.

In block 716, the master device 330 determines a distance d based on the delay D and any correctable $e_{NLOS}$, as discussed in detail above. Next, the process 700 ends.

In block 704, the master device 330 determines that the distance d cannot be determined. Next, the process 700 ends.

Figure 8:
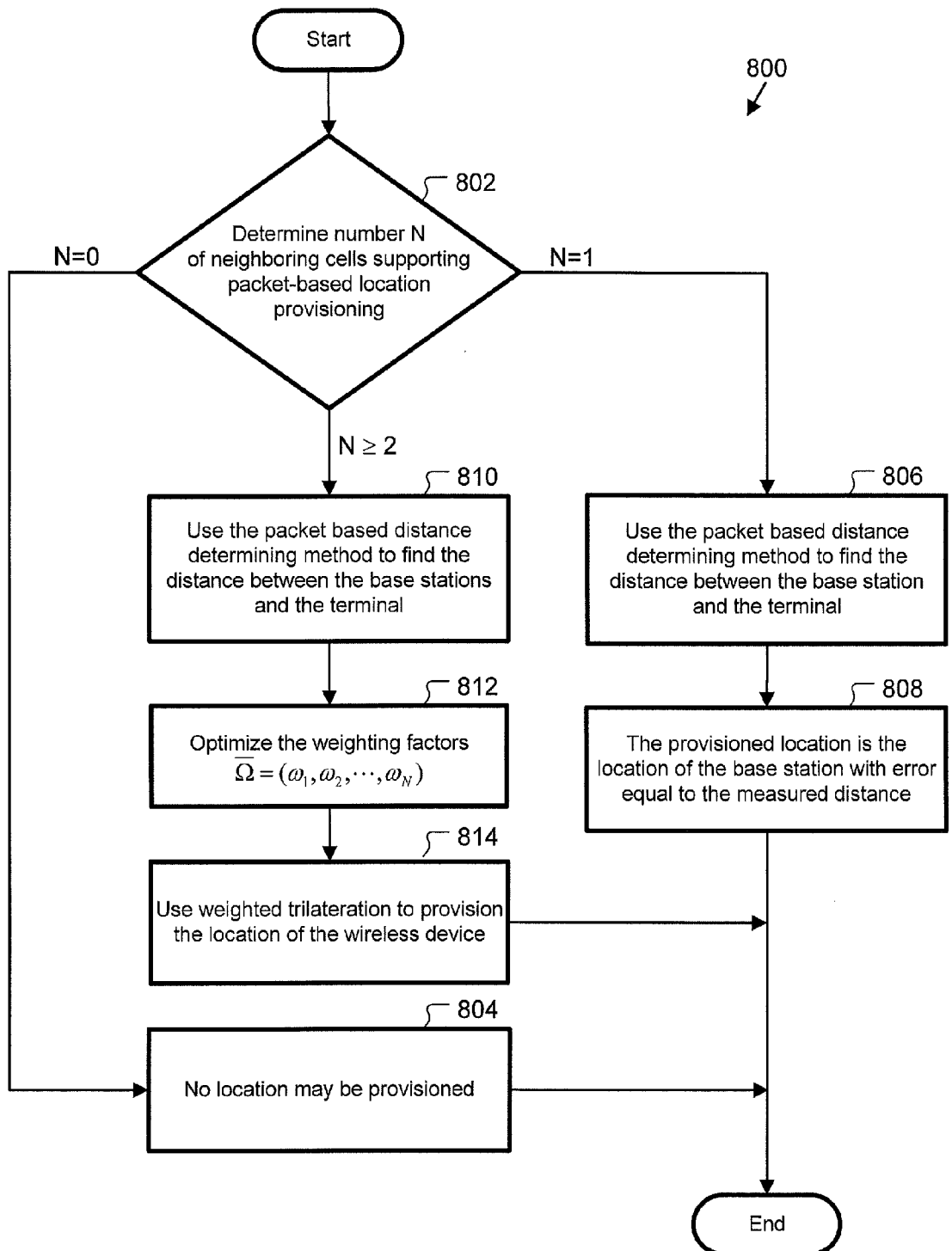
FIG. 8 illustrates an exemplary process for performing a weighted-trilateration to provision a location of a mobile device.

FIG. 8 illustrates an exemplary process 800 for performing a weighted-trilateration to provision a location of a mobile device 120.

In decision block 802, the system determines a number N of neighboring wireless devices 210, such as base stations 110 and mobile devices 120, which support packet based location provisioning. If the number N is determined to be 0, then block 804 is executed next. If the number N is determined to be 1, then block 806 is executed next. If the number N is determined to be 2 or greater, then block 810 is executed next.

In block 804, because no other suitable devices are available, no location may be provisioned. Next, the process 800 ends.

In block 806, the system uses the packed-based location provisioning approach to determine a distance d between the mobile device 120 and the one other device. In some examples, the other device may be a base station 110, while in other examples the other device may be another mobile device 120. The distance d may be determined by processes discussed above, such as by way of the process 700 described in detail in FIG. 7. Next, block 808 is executed.

In block 808, the system provisions the location 410 ($n_x, n_y$) of the mobile device 120 as the location 410 of the other device, with error equal to the measured distance d. Accordingly, the location 410 ($n_x, n_y$) of the mobile device 120 may be provisioned by way of the packet-based location provisioning. Next, process 800 ends.

In block 810, the system uses the packed-based location provisioning approach to determine a set of distances $\overline{D} = (d_1, d_2, d_3, \ldots, d_N)$ between the mobile device 120 and at least a subset of the N other devices. The other devices may be any combination of base stations 110 and mobile devices 120. The distances ($d_1, d_2, d_3, \ldots, d_N$) may be determined by processes discussed above, such as by way of the process 700 described in detail in FIG. 7. Next, block 812 is executed.

In block 812, the system optimizes a set of weighting factors $\overline{\Omega}=(\omega_1, \omega_2, \ldots, \omega_N)$, wherein each of the measured distances $(d_1, d_2, d_3, \ldots, d_N)$ is associated with a corresponding weighting in the set of weightings. As an example, a distance measurement over a more precise technology may be afforded a higher weighting in location provisioning calculations over a technology with a lower precision. As another example, a distance measurement determined by way of a device including more precise hardware may be afforded a higher weighting in location provisioning calculations than a device including hardware of lower precision. As yet another example, a distance measurement may be denied inclusion or weighted relatively lightly in location provisioning calculations if the distance indicated exceeds a range wherein a particular underlying technology is determined to be accurate. Next, block 814 is executed.

In block 814, the system uses the weighted trilateration to provision the location of the mobile device 120. For example, system may perform a least squares optimization taking into account weighting factors as discussed above. Accordingly, the location 410 $(n_x, n_y)$ of the mobile device 120 may be provisioned as the resultant location of the optimization. Next, process 800 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A computing device including a processor and a memory including instructions that, when executed by the processor, are configured to cause the computing device to perform operations comprising:
   identifying at least three distance measurements by way of a packet-based time precision protocol, each distance measurement indicative of a distance between a first wireless device and a different one of a plurality of wireless devices;
   optimizing a set of weighting factors, each of the distance measurements associated with a corresponding weighting in the set of weighting factors;
   assigning at least one of the distance measurements a weighting according to an underlying wireless technology over which the respective distance measurement is determined;
   performing a weighted trilateration of the distance measurements weighted according to the weighting factors; and
   provisioning a location of the first wireless device according to the result of the weighted trilateration.

2. The computing device of claim 1, wherein the instructions, when executed by the processor, cause the computing device to perform operations further comprising performing the weighted trilateration using a least squares optimization weighted according to the set of weighting factors.

3. The computing device of claim 1, wherein the instructions, when executed by the processor, cause the computing device to perform operations further comprising assigning at least one of the distance measurements a weighting according a magnitude of the respective distance measurement.

4. The computing device of claim 3, wherein the weighting is at least one of inversely proportional to the respective distance measurement, linearly decreasing with respect to the respective distance measurement, and reduced to zero according to the respective distance measurement reaching a distance threshold.

5. The computing device of claim 1, wherein a distance measurement performed over a cellular communications link is assigned a greater weighting factor than a distance measurement performed over a wireless local area network link.

6. The computing device of claim 1, wherein the instructions, when executed by the processor, cause the computing device to perform operations further comprising assigning at least one of the distance measurements a weighting according to a precision of a time source of a respective one of the plurality of wireless devices in communication with the first wireless device.

7. The computing device of claim 1, wherein the computing device is the first wireless device.

8. A method, comprising:
   identifying, by a computing device, at least three distance measurements by way of a packet-based time precision protocol, each distance measurement indicative of a distance between a first wireless device and a different one of a plurality of wireless devices;
   optimizing a set of weighting factors by the computing device, each of the distance measurements associated with a corresponding weighting in the set of weighting factors;
   assigning at least one of the distance measurements a weighting according to an underlying wireless technology over which the respective distance measurement is determined;
   performing a weighted trilateration of the distance measurements weighted according to the weighting factors by the computing device; and
   provisioning a location of the first wireless device according to the result of the weighted trilateration.

9. The method of claim 8, further comprising performing the weighted trilateration using a least squares optimization weighted according to the set of weighting factors.

10. The method of claim 8, further comprising assigning at least one of the distance measurements a weighting according a magnitude of the respective distance measurement.

11. The method of claim 10, wherein the weighting is at least one of inversely proportional to the respective distance measurement, linearly decreasing with respect to the respective distance measurement, and reduced to zero according to the respective distance measurement reaching a distance threshold.

12. The method of claim 8, wherein a distance measurement performed over a cellular communications link is assigned a greater weighting factor than a distance measurement performed over a wireless local area network link.

13. The method of claim 8, further comprising assigning at least one of the distance measurements a weighting according to a precision of a time source of a respective one of the plurality of wireless devices in communication with the first wireless device.

14. The method of claim 8, wherein the computing device is the first wireless device.

15. A non-transitory computer-readable medium tangibly embodying computer-executable instructions that, when executed by a processor of a computing device, are configured to cause the computing device to perform operations comprising:
identifying at least three distance measurements by way of a packet-based time precision protocol, each distance measurement indicative of a distance between a first wireless device and a different one of a plurality of wireless devices;
optimizing a set of weighting factors by a computing device, each of the distance measurements associated with a corresponding weighting in the set of weighting factors;
assigning at least one of the distance measurements a weighting according to an underlying wireless technology over which the respective distance measurement is determined;
performing a weighted trilateration of the distance measurements weighted according to the weighting factors by the computing device; and
provisioning a location of the first wireless device according to the result of the weighted trilateration.

16. The computer-readable medium of claim 15, further comprising instructions configured to cause the computing device to perform operations comprising performing the weighted trilateration using a least squares optimization weighted according to the set of weighting factors.

17. The computer-readable medium of claim 15, further comprising instructions configured to cause the computing device to perform operations comprising assigning at least one of the distance measurements a weighting according a magnitude of the respective distance measurement.

18. The computer-readable medium of claim 17, wherein the weighting is at least one of inversely proportional to the respective distance measurement, linearly decreasing with respect to the respective distance measurement, and reduced to zero according to the respective distance measurement reaching a distance threshold.

19. The computer-readable medium of claim 15, wherein a distance measurement performed over a cellular communications link is assigned a greater weighting factor than a distance measurement performed over a wireless local area network link.

20. The computer-readable medium of claim 15, further comprising instructions configured to cause the computing device to perform operations comprising assigning at least one of the distance measurements a weighting according to a precision of a time source of a respective one of the plurality of wireless devices in communication with the first wireless device.

21. The computer-readable medium of claim 15, wherein the computing device is the first wireless device.

* * * * *